United States Patent Office.

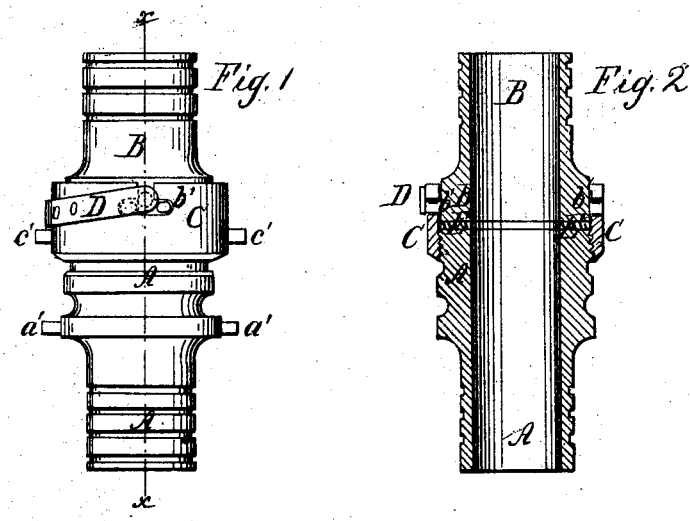

L. J. ROBERTS, OF CORRY, PENNSYLVANIA.

*Letters Patent No. 69,706, dated October 8, 1867.*

IMPROVEMENT IN HOSE-COUPLING.

*The Schedule referred to in these Letters Patent and making part of the same.*

TO ALL WHOM IT MAY CONCERN:

Be it known that I, L. J. ROBERTS, of Corry, in the county of Erie, and State of Pennsylvania, have invented a new and useful Improvement in Hose-Coupling; and I do hereby declare that the following is a full, clear, and exact description thereof, which will enable others skilled in the art to make and use the same, reference being had to the accompanying drawings, forming part of this specification, in which—

Figure 1 is a side view of my improved hose-coupling.

Figure 2 is a vertical longitudinal section of the same, taken through the line $x\,x$, fig. 1.

Figure 3 is an end view of the same.

Similar letters of reference indicate like parts.

My invention has for its object to furnish an improved hose-coupling, so constructed and arranged that it may be quickly coupled and uncoupled, and in which the screw-threads will be guarded from being bruised or injured; and it consists in the hose end and independent nut, constructed as hereinafter more fully described, in combination with each other and with the other hose end.

A and B are the hose ends, and C is the independent nut. The outer end of the hose end A is grooved or corrugated in the ordinary manner, for the attachment of the hose, and it has two pins $a'$ projecting from opposite sides, for the attachment of the wrench. The upper end of the hose end A has a screw-thread cut upon it, as shown in fig. 2. Upon the inner surface of one end of the independent nut C is cut a screw-thread, fitting into the screw-thread cut upon the end of the hose end A. From the opposite sides of the nut C project two pins $c'$, for the attachment of the wrench. In the opposite side edges of the nut C are formed two bayonet slots for the reception of the pins of the hose end B. The outer end of the hose end B is corrugated or grooved in the ordinary manner for the attachment of the hose. The inner end of the hose end B is made to fit into the end of the independent nut C, and has pins $b'$ projecting from its opposite sides, which enter the bayonet slots in said nut, as shown in figs. 1 and 2. D is a spring, one end of which is attached to the nut C, and the other end, which has a slight projection formed upon its lower side, rests over the outer part of the said bayonet slots, to prevent the pins $b'$ from jarring out, should the coupling accidentally become loosened while being transported. E is a rubber or other packing placed between the ends of the hose ends A and B, as shown in fig. 2, to form a close joint for the coupling.

I claim as new, and desire to secure by Letters Patent—

The hose end B, constructed with coupling-pins $b'$, and the independent nut C, constructed with a screw-thread, bayonet slots, and one or more springs D, in combination with each other and with the hose end A, substantially as herein shown and described, and for the purpose set forth.

L. J. ROBERTS.

Witnesses:
FRANK BLACK,
C. O. D. LYTLE.